(12) United States Patent
Lee et al.

(10) Patent No.: US 8,130,864 B1
(45) Date of Patent: Mar. 6, 2012

(54) SYSTEM AND METHOD OF BEAMFORMING WITH REDUCED FEEDBACK

(75) Inventors: Jungwon Lee, Cupertino, CA (US); Rohit U. Nabar, Sunnyvale, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 860 days.

(21) Appl. No.: 12/062,462

(22) Filed: Apr. 3, 2008

Related U.S. Application Data

(60) Provisional application No. 60/909,808, filed on Apr. 3, 2007.

(51) Int. Cl.
 H04K 1/02 (2006.01)
 H04L 25/03 (2006.01)
 H04L 25/49 (2006.01)

(52) U.S. Cl. .................. 375/296; 375/259; 375/285

(58) Field of Classification Search .......... 375/259–260, 375/285, 296
See application file for complete search history.

(56) References Cited

U.S. PATENT DOCUMENTS

| | | | |
|---|---|---|---|
| 6,694,154 B1 * | 2/2004 | Molnar et al. ............. | 455/562.1 |
| 6,703,976 B2 * | 3/2004 | Jacomb-Hood et al. ...... | 342/373 |
| 7,542,515 B2 * | 6/2009 | Li et al. ........................ | 375/260 |
| 7,761,059 B2 * | 7/2010 | Lau ................. | 455/69 |
| 7,773,685 B2 * | 8/2010 | Tirkkonen et al. ............ | 375/267 |
| 7,804,800 B2 * | 9/2010 | Li et al. ......................... | 370/334 |
| 2006/0067421 A1 * | 3/2006 | Walton et al. ................. | 375/267 |
| 2006/0098754 A1 * | 5/2006 | Kim et al. ..................... | 375/267 |
| 2006/0234645 A1 * | 10/2006 | Lin et al. ........................ | 455/69 |
| 2007/0162827 A1 * | 7/2007 | Walton et al. ................. | 714/774 |
| 2008/0019457 A1 * | 1/2008 | Waters et al. ................. | 375/267 |
| 2008/0108310 A1 * | 5/2008 | Tong et al. ..................... | 455/69 |
| 2008/0165866 A1 * | 7/2008 | Teo et al. ...................... | 375/260 |
| 2009/0046009 A1 * | 2/2009 | Fujii ............................. | 342/373 |
| 2010/0046665 A1 * | 2/2010 | Sadowsky ..................... | 375/296 |
| 2010/0189091 A1 * | 7/2010 | Poon ............................. | 370/338 |
| 2010/0226456 A1 * | 9/2010 | Ariyavisitakul .............. | 375/267 |
| 2010/0246377 A1 * | 9/2010 | Zhang et al. .................. | 370/210 |
| 2011/0032893 A1 * | 2/2011 | Li et al. ......................... | 370/329 |

OTHER PUBLICATIONS

Syed Aon Mujtaba, "TGn Sync Proposal Technical Specification", IEEE P802.11 Wireless LANs, May 2005, pp. 1-131.

* cited by examiner

Primary Examiner — Jean B Corrielus

(57) ABSTRACT

A system and method of beamforming may reduce feedback requirements. In some implementations, a beamforming technique may employ a diagonal matrix as a beamforming matrix along with a stream-to-transmit antenna mapping matrix. In some antenna phase beamforming strategies, a diagonal beamforming matrix in which the diagonal elements have a constant magnitude may be employed. Accordingly, a beamforming system may be utilized with few feedback information bits being transmitted from the beamformee; such a system may also minimize or eliminate power fluctuations among multiple transmit antennae.

36 Claims, 3 Drawing Sheets

SYSTEM AND METHOD OF BEAMFORMING WITH REDUCED FEEDBACK

CROSS-REFERENCE TO RELATED APPLICATIONS

The present application claims the benefit of U.S. provisional application Ser. No. 60/909,808, filed Apr. 3, 2007, entitled "MIMO Beamforming with Reduced Feedback", the disclosure of which is incorporated herein by reference in its entirety.

BACKGROUND

1. Field of the Invention

Aspects of the present invention relate generally to wireless communication techniques, and more particularly to a system and method of beamforming with reduced feedback requirements.

2. Description of Related Art

Recently, the wireless communication industry has demonstrated an increasing interest in beamforming techniques for use in connection with multiple input, multiple output (MIMO) systems. For example, MIMO beamforming systems have been considered in standards promulgated by the Institute of Electrical and Electronics Engineers (IEEE), most notably the IEEE 802.11n standard for wireless local area networks (WLANs). One advantage of beamforming methodologies is that they can increase the data rate between networked devices without the attendant increase in transmit power or bandwidth that would be necessary to achieve a similar data rate in MIMO systems without beamforming.

One relatively popular beamforming approach uses singular value decomposition (SVD) techniques. However, this method requires a lot of feedback information (i.e., signal information transmitted from the receive device back to the beamforming transmit device). Conventional SVD beamforming also introduces transmit power fluctuations among antennae; thus, traditional beamforming strategies may not efficiently satisfy a per-antenna transmit power constraint.

Therefore, it may be desirable in some instances to provide a beamforming technique that requires significantly less feedback information than the SVD beamforming technique; additionally, it may be desirable to provide a beamforming strategy that does not introduce power fluctuations over multiple-transmit antennae.

SUMMARY

Embodiments of the present invention overcome the above-mentioned and various other shortcomings of conventional technology, providing a system and method of beamforming with reduced feedback requirements. In some implementations, a beamforming technique may employ a diagonal matrix as a beamforming matrix along with a stream-to-transmit antenna mapping matrix. In some antenna phase beamforming strategies, a diagonal beamforming matrix in which the diagonal elements have a constant magnitude may be employed. Accordingly, a beamforming system may be utilized with few feedback information bits being transmitted from the beamformee; such a system may also minimize or eliminate power fluctuations among multiple transmit antennae.

The foregoing and other aspects of various embodiments of the present invention will be apparent through examination of the following detailed description thereof in conjunction with the accompanying drawing figures.

BRIEF DESCRIPTION OF THE DRAWING FIGURES

DETAILED DESCRIPTION

Introduction

Figure 1:
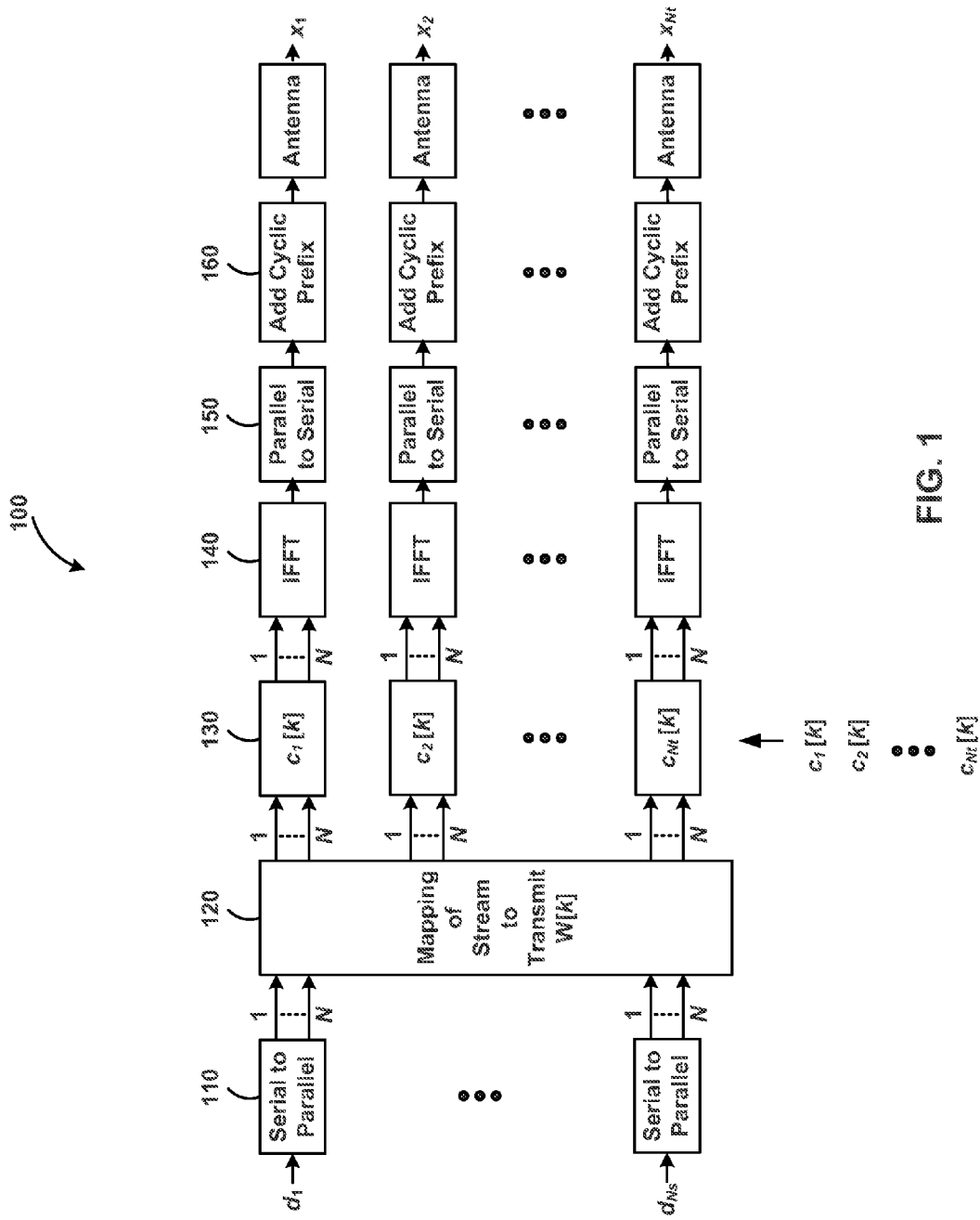
FIG. 1 is a simplified diagram illustrating components of one embodiment of a transmitter implementing a diagonal matrix beamforming technique.

The beamforming techniques described below may be utilized for flat fading channels as well as for frequency selective fading channels with orthogonal frequency division multiplexing (OFDM). For simplicity, the beamforming techniques are explained in the context of single carrier systems for flat fading channels; those of skill in the art will appreciate that the disclosed methodologies may readily be extended to be implemented in OFDM systems.

In some implementations, the receive signal may be modeled as $$y = Hx + z \quad \text{(Equation 1)}$$

where $$y = [y_1 \; \cdots \; y_{N_R}]^T \quad \text{(Equation 2)}$$

$$H = \begin{bmatrix} h_{1,1} & \cdots & h_{1,N_T} \\ \vdots & \ddots & \vdots \\ h_{N_R,1} & \cdots & h_{N_R,N_T} \end{bmatrix} \quad \text{(Equation 3)}$$

$$x = [x_1 \; \cdots \; x_{N_T}]^T \quad \text{(Equation 4)}$$

$$z = [z_1 \; \cdots \; z_{N_R}]^T \quad \text{(Equation 5)}$$

In this model, $x_t$, is a transmit signal from a transmit antenna, t, $z_r$ is the noise in a receive antenna, r, $h_{r,t}$ is a channel gain from transmitter, t, to receiver, r, and $N_R$ and $N_T$ are the number of receive and transmit antennae, respectively. Additionally, $N_S$ may represent the number of transmit streams, which should be constrained such that $N_S \leq \min\{N_R, N_T\}$.

It is typically assumed that the power of each antenna is limited by an average power constraint as follows:

$$E[|x_t|^2] = \frac{P}{N_T}, \text{ for } t = 0, \; \ldots \; , N_T - 1 \quad \text{(Equation 6)}$$

where P is the maximum total power of the transmitter.

Given the foregoing model, conventional beamforming techniques based upon singular value decomposition (SVD) may be explained as set forth below.

First, the beamformer (e.g., a transmit device) sends a known sounding signal to a beamformee (e.g., a receive device). Generally, the sounding signal utilized for each subcarrier consists of columns of a unitary matrix, $S \in C^{N_T \times N_T}$, referred to as a sounding matrix. To maximize utilization of the power of each transmit antenna, the sounding matrix, S, may be limited to a matrix that has the same magnitudes for all elements; examples of such matrices include a Hadamard matrix and a Fourier matrix. Thus, the transmitted signal used for sounding may be expressed as $$X = S \quad \text{(Equation 7)}$$

where S is a matrix with $S^*S = SS^* = I$.

Then the signal received by the beamformee can, be represented as $$Y = HS + Z \quad \text{(Equation 8)}$$

where each of Y and Z is a matrix of size $N_R \times N_T$. The beamformee may then calculate the beamforming matrix by first undoing the effect of the sounding matrix and then calculating SVD on the channel estimate. The channel estimate may be calculated simply as follows:

$$\hat{H} = YS^* \quad \text{(Equation 9)}$$

The SVD on $\hat{H}$ is $$\hat{H} = U\Sigma V^* \quad \text{(Equation 10)}$$

where $U \in C^{N_R \times N_R}$ and $V \in C^{N_T \times N_T}$ are unitary matrices and $\Sigma \in C^{N_R \times N_T}$ is a matrix in which all off-diagonal elements have values of zero. In the absence of noise, $HV = U\Sigma$.

After performing the SVD computations, the beamformee may then feedback V as a beamforming matrix to the beamformer. The beamformer may then implement the beamforming matrix for regular data transmission as follows:

$$x = Vd \quad \text{(Equation 11)}$$

where the data vector, d, is expressed as $$d = [d_1 d_2 \ldots d_{N_S} 0 \ldots 0]^T \quad \text{(Equation 12)}$$

Here $d_s$ represents a data symbol for a particular data stream, s, and the vector, d, includes a number (equal to $N_T - N_S$) of trailing elements having a value of zero.

If there were no noise at the sounding stage, the received signal at the beamformee is $$y = U\Sigma d = z \quad \text{(Equation 13)}$$

and the receiver can use a simple linear equalizer for decoding. In particular, the receiver may execute the following operation $$\hat{d} = \Sigma^{-1} U^* y \quad \text{(Equation 14)}$$

and then the receiver may execute hard decoding or soft decoding as a function of the signal to noise ratio (SNR) of each stream.

Although the foregoing conventional beamforming technique has limited utility in some applications, its practical implementation suffers from various problems. First, the beamforming matrix feedback is too large. In particular, the beamforming matrix, V, has $N_{T2}$ elements. All these elements are transmitted to the beamformee when, in fact, the whole matrix V need not be fed back in many instances. Traditional strategies do not realize the efficiencies that may be achieved in recognizing that only $\min\{N_T, N_R\}$ columns of V need to be fed back; in any event, at least $N_T \min\{N_T, N_R\}$ complex numbers must be fed back to the beamformer in order to construct a suitable beamforming matrix. Second, all the elements in the transmit signal, x, do not have the same magnitude in conventional beamforming techniques. While these fluctuating magnitude values may be tolerable in some cases, it is generally desirable to provide a transmit signal with elements of equal magnitude to satisfy pre-existing per-antenna power constraints.

Implementation

Turning now to the drawing figures, FIG. 1 is a simplified diagram illustrating components of one embodiment of a transmitter implementing a diagonal matrix beamforming technique. In some embodiments, the functional blocks illustrated in FIG. 1 may be implemented as hardware components. For example, the various elements may be integrated into a single, monolithic integrated circuit (IC) or an application specific IC (ASIC). Additionally or alternatively, some or all of the functional blocks may be implemented independently (i.e., on multiple ICs or chips), for instance, using programmable logic hardware or more than one ASIC. In some implementations, various of the elements may be programmable or otherwise configurable in accordance with system requirements, communications protocols, and other factors affecting desired or necessary operational characteristics of transmitter 100. In that regard, some of the functional blocks of transmitter 100 may be implemented in software or other encoded instruction sets, for example, executed by a microprocessor or microcontroller (not illustrated in the drawing figure). Accordingly, the term "module" in the context of the following description is intended to encompass both hardware and software embodiments of a particular functional block; those of skill in the art will appreciate that any number of software applications or instruction sets, and various circuitry or hardware components supported by firmware may readily be designed to support the functionality set forth below.

In the FIG. 1 embodiment, transmitter 100 may generally comprise serial to parallel modules 110, each operative to de-serialize a data stream (e.g., $d_1$). A mapping module 120 may modify the data stream in accordance with a stream-to-transmit antenna mapping matrix (e.g., W[k]) substantially as set forth below; as indicated in the drawing figure, this matrix may be applied to all data streams supported by transmitter 100. Individual beamforming matrices (e.g., $c_1[k]$, $c_2[k]$, etc.) may be employed by beamforming matrix modules 130 to modify each data stream substantially as set forth below.

Similarly, individual Inverse Fast Fourier Transform (IFFT) modules 140 and parallel to serial modules 150 may transform to the time domain and format, respectively, each data stream for transmission. Following addition of a cyclic prefix at module 160, data streams (e.g., $x_1$, $x_2$, etc.) may be transmitted in a conventional manner. In that regard, the architecture of the FIG. 1 embodiment may have utility in systems operating in accordance with various communications protocols such as, but not limited to, IEEE 802.11n (WLAN) or Wireless Fidelity (WiFI) systems, Worldwide Interoperability for Microwave Access (WiMAX) systems, and various OFDM networks.

It is noted that transmitter 100 may generally comprise additional components not illustrated in FIG. 1. For example, transmitter may include a sounding signal generation module to construct a sounding signal from which the beamforming matrix may be derived substantially as set forth below. Transmitter may also include baseband modules, modulators, local oscillators or frequency references, and other components generally known in the art of wireless communications.

Figure 3:
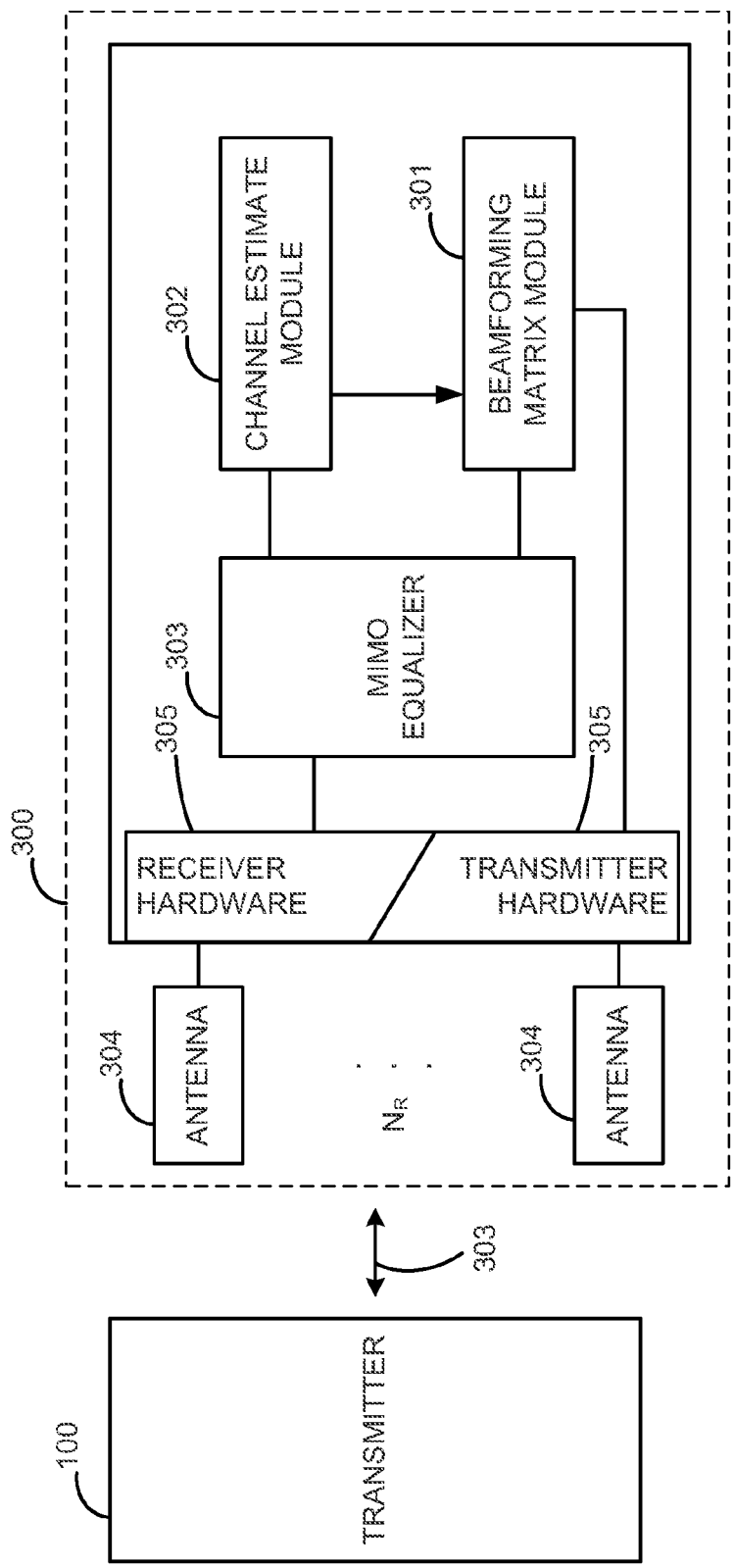
FIG. 3 is a simplified diagram illustrating components of one embodiment of a receiver implementing a diagonal matrix beamforming technique and in communication with a transmitter.

FIG. 3 is a simplified diagram illustrating components of one embodiment of a receiver implementing a diagonal matrix beamforming technique, and in communication with a transmitter. It will be appreciated that a beamformee (e.g., receiver 300) operative to communicate with transmitter 100 may comprise modules that are similar to those illustrated in FIG. 1. For example, receiver 300 may comprise a beamforming matrix module 301 that is capable of performing the functionality described below for creating, calculating, or otherwise selecting a beamforming matrix to be fed back to transmitter 100 via a communication path 303. In that regard, receiver 300 may include channel estimate module 302 to calculate a channel estimate from a transmit signal received from transmitter 100 via a communication path 303; as set forth below, such a channel estimate may have utility in calculating a beamforming matrix. Additionally, receiver 300 may comprise suitable antenna 304 and transmitter (and receiver) hardware 305, as well as appropriate serializer, de-serializer, and transform modules enabling bi-directional data and other communications. As noted above with reference to transmitter 100, such modules implemented in receiver 300 may be embodied in hardware (such as dedicated circuitry, programmable logic, or ASIC hardware) or software applications or instruction sets executed by a microprocessor microcontroller.

To reduce the feedback information required for efficient beamforming, the beamforming matrix may be restricted to a diagonal matrix. In accordance with some embodiments, the transmit signal may be generated as follows:

$$x = CWd \quad \text{(Equation 15)}$$

where the stream-to-transmit antenna mapping matrix, W, is the first $N_S$ columns of a unitary matrix of size $N_T \times N_T$ in which all elements have the same magnitude, and the transmit beamforming matrix, C, is a diagonal matrix in which the (1,1)-th entry is 1:

$$C = \mathrm{diag}([1 c_2 \ldots c_{N_T}]) \quad \text{(Equation 16)}$$

In this context, $c_t$ is a complex gain for a transmit antenna, t, i.e., the elements of the beamforming matrix represent complex gain values.

The following beamforming protocol may be employed by the architecture illustrated in FIG. 1. The beamformer (e.g., transmitter 100) may first transmit a known sounding signal, S. The signal received by the beamformee may be expressed as set forth above with reference to an SVD system (where each of Y and Z is a matrix of size $N_T \times N_T$):

$$Y = HS + Z \quad \text{(Equation 17)}$$

The channel estimate, $\hat{H}$, may be calculated as follows:

$$\hat{H} = YS^* \quad \text{(Equation 18)}$$

With this channel estimate, a beamforming matrix, C, may be computed by the beamformee, fed back to the beamformer, and used to seed or initialize beamforming matrix modules 130. It will be appreciated that the best beamforming matrix may generally depend upon, among other factors, the type of multiple input, multiple output (MIMO) equalizer 303 employed by the beamformee. Examples of MIMO equalizer 303 include, but are not limited to: zero-forcing (ZF) linear equalizers (LEs); minimum mean square error (MMSE) LEs; ZF decision feedback equalizers (DFEs); and MMSE DFEs. A maximum likelihood receiver may also be employed. In the following example, it is assumed that the beamformee is implementing a ZF linear equalizer, though the present disclosure and claimed subject matter are not intended to be limited by the nature or architectural and operational characteristics of the equalizer utilized at the beamformee.

The effective channel matrix for the regular data may be expressed as $$H_e = HCW \quad \text{(Equation 19)}$$

Then the ZF receiver's mean square error of the i-th stream may be represented as $\sigma_z^2 (R^{-1})_{ii}$, where $$R = H_e^* H_e = W^* C^* H^* HCW \quad \text{(Equation 20)}$$

Thus the SNR of the i-th stream is given as $$\frac{\sigma_d^2}{\sigma_z^2 (R^{-1})_{ii}},$$

and the average SNR may be defined as $$SNR_{avg} = \prod_{i=1}^{N_S} (1 + SNR_i) - 1 \quad \text{(Equation 21)}$$

One strategy for selecting C may be to find the matrix C that maximizes the average SNR as set forth in Equation 21. Alternatively, a simpler strategy may be to find the matrix C that minimizes the product of the diagonal elements of $R^{-1}$. Still another strategy may be to maximize (across streams) the minimum SNR.

After computing the beamforming matrix, C, the beamformee may then provide $c_1, \ldots, c_{N_T}$ as feedback. The beamformer may utilize this beamforming matrix C for subsequent regular data transmission by modifying the data streams at modules 130. In the special case of only a single receive antenna, this operation may employ the optimal transmit maximal ratio combining (MRC) scheme.

The foregoing beamforming scheme requires much less feedback than traditional SVD beamforming; the diagonal matrix approach may only feedback $N_T - 1$ complex numbers (as compared to $N_T \min\{N_T, N_R\}$ complex numbers required by conventional approaches). In case of quantized feedback, the real part and the imaginary part of $c_t$, may be quantized separately. As an alternative, the magnitude and the angle of $c_t$ may be quantized.

In practical communication systems, the number of feedback bits is generally quite small as compared to overall data throughput. Accordingly, the number of possible candidates for the beamforming matrix, C, is small. As a consequence, an optimum beamforming matrix may be found using an exhaustive search strategy without requiring hardware or algorithmic complexity, and without introducing computational overhead which may slow the system in an undesirable manner.

Though the foregoing example addresses finding an optimal beamforming matrix when instantaneous feedback is available, the technique may also be utilized in situations in which the receiver has only partial information about the channel (e.g., such as transmit correlation, receive correlation, etc.).

In accordance with some embodiments, the amount of feedback required may be further reduced by restricting the magnitude of the diagonal elements of the beamforming matrix to a constant value (e.g., 1 or some other integer value). In some implementations, for example, the complex antenna gain, $c_t$, of transmit antenna, t, may be constrained to $c_t = e^{j\theta_t}$. The beamforming protocol may be similar to that described above, however, where $c_t$ is suitably constrained, the search space (of $c_t$) for the best beamforming matrix may be limited to the phase, $\theta_t$, only.

This antenna phase beamforming strategy requires much less feedback information than SVD beamforming; additionally, it does not cause power fluctuations, and can readily satisfy any pre-existing per-antenna constraints on the system.

The selection of a beamforming matrix may be accomplished in many ways and may depend, for instance, upon various factors including the type of MIMO equalizer employed by the beamformee. For example, the beamforming matrix may be selected based upon the average (or minimum) SNR with a linear equalizer as set forth above.

The following description addresses selection of a beamforming matrix in a two stream context; in the simplified example employing only two transmit antennae and two streams, the number of receive antennae should be greater than or equal to 2. It will be appreciated that the example is provided to illustrate the principles underlying the disclosed beamforming techniques, and that the present disclosure is not intended to be limited by the number of transmit antennae employed by any particular device or system.

In some instances, a simple strategy for selecting a beamforming matrix may be to find a matrix that minimizes the magnitude of the correlation between two columns of an equivalent channel matrix (see Equations 22-25 below). This correlation generally represents how similar (or "close") the two columns are and thus how large the inter-channel interference is. It can be shown that, regardless of the beamforming matrix, the total power of the channel remains constant; accordingly, minimizing the interference will also result in a corresponding increase in direct channel gains. The equivalent channel may be expressed as $$H_e = HCW \quad \text{(Equation 22)}$$

$$= [h_1 \, h_2] \begin{bmatrix} 1 & 0 \\ 0 & e^{j\theta_2} \end{bmatrix} \frac{1}{\sqrt{2}} \begin{bmatrix} 1 & 1 \\ 1 & -1 \end{bmatrix} \quad \text{(Equation 23)}$$

$$= \frac{1}{\sqrt{2}} [h_1 \, h_2] \begin{bmatrix} 1 & 1 \\ e^{j\theta_2} & -e^{j\theta_2} \end{bmatrix} \quad \text{(Equation 24)}$$

$$= \frac{1}{\sqrt{2}} [h_1 + e^{j\theta_2} h_2 \, h_1 - e^{j\theta_2} h_2] \quad \text{(Equation 25)}$$

The correlation between two columns of $H_e$ may be computed by $$h_{e,1}^* h_{e,2} = \frac{\|h_1\|^2 - \|h_2\|^2}{2} + jI\{e^{-j\theta_2} h_2^* h_1\} \quad \text{(Equation 26)}$$

where I(x) represents the imaginary part of x. The magnitude square of the first column of the equivalent channel is $$\|h_{e,1}\|^2 = \frac{\|h_1\|^2 + \|h_2\|^2}{2} + jR\{e^{-j\theta_2} h_2^* h_1\} \quad \text{(Equation 27)}$$

whereas that of the second column is $$\|h_{e,2}\|^2 = \frac{\|h_1\|^2 + \|h_2\|^2}{2} - jR\{e^{-j\theta_2} h_2^* h_1\} \quad \text{(Equation 28)}$$

To minimize the magnitude of the correlation, $\theta_2$ may be selected as follows:

$$\theta_2 = \angle(h_2^* h_1) \quad \text{(Equation 29)}$$

With this value of $\theta_2$, the correlation between two columns of $H_e$ becomes $$h_{e,1}^* h_{e,2} = \frac{\|h_1\|^2 - \|h_2\|^2}{2} \quad \text{(Equation 30)}$$

The magnitude square of the first column of the equivalent channel becomes $$\|h_{e,1}\|^2 = \frac{\|h_1\|^2 + \|h_2\|^2}{2} + |h_2^* h_1|^2 \quad \text{(Equation 31)}$$

whereas that of the second column becomes $$\|h_{e,2}\|^2 = \frac{\|h_1\|^2 + \|h_2\|^2}{2} - |h_2^* h_1|^2 \quad \text{(Equation 32)}$$

The modulation and coding selection (MCS) may be executed based on the equivalent channel matrix $H_e$ with the selected value of $\theta_2$. As set forth above, the MCS may depend upon a variety of factors including the type of MIMO equalizer employed at the receiver.

The foregoing MIMO beamforming techniques require reduced feedback as compared with other strategies. In some implementations, a beamforming technique may employ a diagonal matrix as a beamforming matrix along with a stream-to-transmit mapping matrix. The stream-to-transmit mapping matrix may be selected as the columns of a unitary matrix in which all elements have the same magnitude. In some antenna phase beamforming strategies, a diagonal beamforming matrix in which the diagonal has a constant magnitude (e.g., 1) may be employed. As set forth above, these techniques have reduced feedback requirements, i.e., a beamforming system may be utilized with few feedback information bits being transmitted from the beamformee. The antenna phase beamforming technique requires even fewer feedback bits than the simple diagonal matrix beamforming technique, and also may minimize or eliminate power fluctuations among multiple transmit antennae.

Figure 2:
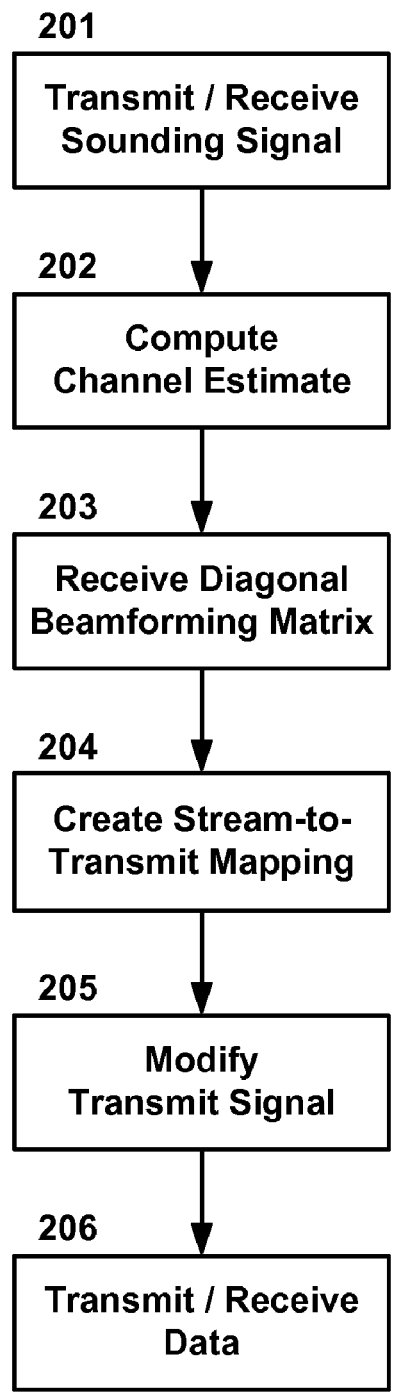
FIG. 2 is a simplified flow diagram illustrating operation of one embodiment of a beamforming method implementing a diagonal matrix.

FIG. 2 is a simplified flow diagram illustrating operation of one embodiment of a beamforming method implementing a diagonal matrix. As indicated at block 201 a sounding signal may be transmitted by the beamformer (such as transmitter 100 in FIG. 1) and received by a receiver device. A channel estimate may be computed as indicated at block 202, which may be used to create a diagonal beamforming matrix; in that regard, the beamforming matrix may be computed in response to the sounding signal, since the channel estimate is derived from this signal. Examples of calculating a diagonal beamforming matrix from a channel estimate are set forth above with reference to Equations 18-21 and Equations 22-32. In accordance with beamforming strategies in general, the operations depicted at blocks 202 and 203 may be executed by the receiver (such as the receiver 300); the results (i.e., the beamforming matrix) are fed back to the transmitter (such as transmitter 100) for use in modification of the transmit signal. In some embodiments, the beamforming matrix is a diagonal matrix of the form $C = \text{diag}([1 c_2 \ldots c_{N_T}])$ where $c_i$ is a complex gain for a transmit antenna; in some alternative embodiments, $c_i$ need not be equal to 1. The beamforming matrix may be received by the beamformer (such as the transmitter 100) as indicated at block 203.

A stream-to-transmit antenna mapping matrix may be created as indicated at block 204. As set forth above with reference to Equation 15, the stream-to-transmit mapping matrix may represent the first $N_S$ columns of a unitary matrix of size $N_T \times N_T$ in which all elements have the same magnitude (where $N_S$ is the number of data streams supported by the transmitter and $N_T$ is the number of transmit antennae). The stream-to-transmit matrix (like the beamforming matrix) may be employed to modify the transmit signal substantially as set forth above with reference to FIG. 1; this operation is depicted at block 205 in FIG. 2. In particular, a data stream to be transmitted may be, modified in accordance with the diagonal beamforming matrix and the stream-to-transmit mapping matrix. Following quantization (if necessary or desired), formatting, and insertion of any cyclic prefix (if required) data streams may be transmitted (block 206) for reception by a beamformee.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A beamforming method comprising:
creating a stream-to-transmit mapping matrix;
creating a diagonal beamforming matrix in accordance with a type of equalizer employed by a receiver and in response to a sounding signal transmitted to the receiver;
transmitting a plurality of diagonal elements of the diagonal beamforming matrix; and
modifying a data stream to be transmitted in accordance with the transmitted plurality of diagonal elements of the diagonal beamforming matrix and the stream-to-transmit mapping matrix.

2. The method of claim 1, wherein the creating a diagonal beamforming matrix comprises utilizing a channel estimate derived from the sounding signal.

3. The method of claim 1, wherein the plurality of diagonal elements of the diagonal beamforming matrix represent complex gain values.

4. The method of claim 1, wherein the (1,1)-th element of the diagonal beamforming matrix is 1.

5. The method of claim 1, wherein all diagonal elements of the diagonal beamforming matrix have a same magnitude.

6. The method of claim 1, wherein the stream-to-transmit mapping matrix is part of a unitary matrix in which all elements have a same magnitude.

7. The method of claim 1, wherein the creating a diagonal beamforming matrix comprises selecting a matrix based upon an average signal-to-noise ratio of the data stream.

8. The method of claim 1, wherein the creating a diagonal beamforming matrix comprises selecting a matrix based upon a correlation between two columns of an equivalent channel matrix.

9. The method of claim 1, wherein the creating a diagonal beamforming matrix comprises finding an optimum diagonal beamforming matrix by using an exhaustive search strategy.

10. The method of claim 1, wherein the plurality of diagonal elements of the diagonal beamforming matrix represent at least one phase associated with at least one transmit antenna.

11. A beamformer comprising:
a mapping module to modify a first data stream in accordance with a stream-to-transmit mapping matrix to generate a second data stream;
a beamforming matrix module to generate a third data stream by modifying the second data stream in accordance with a diagonal beamforming matrix, the diagonal beamforming matrix having been created in response to a sounding signal and in accordance with a type of equalizer employed by a receiver to which the sounding signal is transmitted; and
at least one transmit antenna to transmit the third data stream to the receiver.

12. The beamformer of claim 11, wherein a diagonal element of the diagonal beamforming matrix represents a complex gain value associated with the at least one transmit antenna.

13. The beamformer of claim 11, wherein the mapping module is implemented in hardware.

14. The beamformer of claim 11, wherein the stream-to-transmit mapping matrix is part of a unitary matrix in which all elements have a same magnitude.

15. The beamformer of claim 11, wherein the beamforming matrix module is implemented in hardware.

16. The beamformer of claim 11, wherein all diagonal elements of the diagonal beamforming matrix have a same magnitude.

17. A method comprising:
receiving, at a beamformee device, a sounding signal transmitted by a beamformer device;
calculating a channel estimate based on the sounding signal;
calculating, at the beamformee device and based on the channel estimate, a diagonal beamforming matrix in accordance with a type of equalizer employed by the beamformee device; and
transmitting a plurality of diagonal elements of the diagonal beamforming matrix to the beamformer device.

18. The method of claim 17, wherein elements of the diagonal beamforming matrix represent complex gain values.

19. The method of claim 17, wherein the (1,1)-th element of the diagonal beamforming matrix is 1.

20. The method of claim 17, wherein the plurality of diagonal elements of the diagonal beamforming matrix have a same magnitude.

21. The method of claim 17, wherein calculating the diagonal beamforming matrix comprises finding a diagonal matrix that maximizes an average signal-to-noise ratio (SNR) across a plurality of streams.

22. The method of claim 17, wherein calculating the diagonal beamforming matrix comprises finding a diagonal matrix that minimizes a product of diagonal elements of a matrix $R^{-1}$, where $R = W^* C^* H^* HCW$, wherein W is a stream-to-transmit antenna mapping matrix, C is the diagonal beamforming matrix, and H is a channel estimate matrix.

23. The method of claim 17, wherein calculating the diagonal beamforming matrix comprises finding a diagonal matrix that maximizes a minimum signal-to-noise ratio (SNR) across a plurality of streams.

24. The method of claim 17, wherein calculating the diagonal beamforming matrix comprises finding a diagonal matrix that minimizes a magnitude of a correlation between two columns of an equivalent channel matrix.

25. The method of claim 17, wherein calculating the diagonal beamforming matrix comprises using an exhaustive search strategy.

26. The method of claim 17, further comprising quantizing the plurality of diagonal elements of the diagonal beamforming matrix.

27. An apparatus, comprising:
a channel estimate module configured to calculate a channel estimate based on a sounding signal received from a beamformer device;

a beamforming matrix module coupled to the channel estimate module, wherein the beamforming matrix module is configured to calculate, based on the channel estimate, a diagonal beamforming matrix in accordance with a type of an equalizer employed at the apparatus; and transmitter hardware coupled to the beamforming matrix module, wherein the transmitter hardware is configured to transmit a plurality of diagonal elements of the diagonal beamforming matrix to the beamformer device.

28. The apparatus of claim 27, wherein the beamforming matrix module is configured to calculate the diagonal beamforming matrix so that elements of the diagonal beamforming matrix represent complex gain values.

29. The apparatus of claim 27, wherein the beamforming matrix module is configured to calculate the diagonal beamforming matrix so that the (1,1)-th element of the diagonal beamforming matrix is 1.

30. The apparatus of claim 27, wherein the beamforming matrix module is configured to calculate the diagonal beamforming matrix so that the plurality of diagonal elements of the diagonal beamforming matrix have a same magnitude.

31. The apparatus of claim 27, wherein the beamforming matrix module is configured to find a diagonal matrix that maximizes an average signal-to-noise ratio (SNR) across a plurality of streams.

32. The apparatus of claim 27, wherein the beamforming matrix module is configured to find a diagonal matrix that minimizes a product of diagonal elements of a matrix $R^{-1}$, where $R=W^*C^*H^*HCW$, wherein W is a stream-to-transmit antenna mapping matrix, C is the diagonal beamforming matrix, and H is a channel estimate matrix.

33. The apparatus of claim 27, wherein the beamforming matrix module is configured to find a diagonal matrix that maximizes a minimum signal-to-noise ratio (SNR) across a plurality of streams.

34. The apparatus of claim 27, wherein the beamforming matrix module is configured to find a diagonal matrix that minimizes a magnitude of a correlation between two columns of an equivalent channel matrix.

35. The apparatus of claim 27, wherein the beamforming matrix module is configured to use an exhaustive search strategy.

36. The apparatus of claim 27, wherein the beamforming matrix module is configured to quantize the plurality of diagonal elements of the diagonal beamforming matrix.

* * * * *